… … …

United States Patent [19]
Richey et al.

[11] Patent Number: 5,545,417
[45] Date of Patent: Aug. 13, 1996

[54] NATURAL CARBOHYDRATE GUM HYDROLYZATE COATED CHEWING GUM

[75] Inventors: Lindell C. Richey, Lake Zurich; Jeffrey S. Hook, Berwyn; Michael A. Reed, Naperville; Robert J. Yatka, Orland Park, all of Ill.

[73] Assignee: Wm. Wrigley Jr. Company, Chicago., Ill.

[21] Appl. No.: 491,849

Related U.S. Application Data

[63] Continuation-in-part of PCT/US92/11198, Dec. 23, 1992.

[22] PCT Filed: Dec. 3, 1993

[86] PCT No.: PCT/US93/11764

§ 371 Date: Jun. 22, 1995

§ 102(e) Date: Jun. 22, 1995

[87] PCT Pub. No.: WO94/14331

PCT Pub. Date: Jul. 7, 1994

[51] Int. Cl.$^6$ ...................................................... A23G 3/30
[52] U.S. Cl. ............................. 426/5; 426/573; 426/302; 426/303; 426/305; 426/658
[58] Field of Search ...................................... 426/3–6, 573, 426/658, 302, 303, 305, 658

[56] References Cited

U.S. PATENT DOCUMENTS

| | | | |
|---|---|---|---|
| 3,161,524 | 12/1964 | Opie et al. | 426/555 |
| 3,455,899 | 7/1969 | Keen | 426/573 |
| 3,843,818 | 10/1974 | Wren et al. | 426/557 |
| 3,996,389 | 12/1976 | Osborne | 426/565 |
| 4,127,677 | 11/1978 | Fronczkowski et al. | 426/5 |
| 4,332,894 | 6/1982 | Whistler | 426/573 X |
| 4,792,453 | 12/1988 | Reed et al. | 426/5 |
| 4,828,845 | 5/1989 | Zamudio-Tena et al. | 426/5 |
| 5,133,979 | 7/1992 | Clarke et al. | 426/49 |
| 5,156,835 | 10/1992 | Nabi et al. | 424/52 |
| 5,248,508 | 9/1993 | Reed et al. | 426/5 |
| 5,437,875 | 8/1995 | Synosky et al. | 426/3 |
| 5,462,754 | 10/1995 | Synosky et al. | 426/4 |

FOREIGN PATENT DOCUMENTS

| | | |
|---|---|---|
| 0324720 | 7/1989 | European Pat. Off. . |
| 0449594 | 10/1991 | European Pat. Off. . |
| 0457098 | 11/1991 | European Pat. Off. . |
| 60-224449 | 11/1985 | Japan . |
| 62-146562 | 6/1987 | Japan . |
| 5-115247 | 5/1993 | Japan . |
| WO90/14017 | 11/1990 | WIPO . |
| WO93/15116 | 8/1993 | WIPO . |
| WO94/14332 | 7/1994 | WIPO . |
| WO94/14331 | 7/1994 | WIPO . |
| WO94/16575 | 8/1994 | WIPO . |

OTHER PUBLICATIONS

Guar Gum by James K. Seaman, 19 pp., undated.
Advertising brochure entitled "Hydorcolloids" by Sanofi Bio–Industries, 73 pp., 1993.
Advertising brochure entitled "Sunfiber" by Sandoz Nutrition, 2 pp., undated.
Information Sheet entitled "Benefiber" by Sandoz, 1 p., 1992.
Report entitled "What is Sunfiber?" by IBC USA Conference on bulking Agents, Prospects & Applications, 33 pp., 1991.

*Primary Examiner*—Jeanette M. Hunter
*Attorney, Agent, or Firm*—Steven P. Shurtz; Willian Brinks Hofer Gilson & Lione

[57] ABSTRACT

A chewing gum pellet coated with a coating of natural carbohydrate gum hydrolyzate material, wherein the material is selected from the group consisting of guar gum hydrolyzate, locust bean gum hydrolyzate and karaya gum hydrolyzate. The coating may also include xylitol.

19 Claims, No Drawings

NATURAL CARBOHYDRATE GUM HYDROLYZATE COATED CHEWING GUM

CROSS REFERENCE TO RELATED APPLICATION

The present application is a continuation-in-part of PCT Application Serial No. PCT/US92/11198, filed Dec. 23, 1992, designating the United States, which is hereby incorporated by reference.

BACKGROUND OF THE INVENTION

The present invention relates to improved chewing gum products. More particularly, the present invention relates to improving chewing gum products by the use of natural carbohydrate gum hydrolyzates in a coating applied to the gum products.

Chewing gums are frequently enclosed with hard or soft coatings. Coatings provide an opportunity for the manufacturer to vary product characteristics such as taste, appearance and nutritional value. In recent years, efforts have been devoted to producing sugarless hard coatings for chewing gum. In today's health conscious society, gums containing sugarless sweeteners are popular confectionery items. In response to this consumer demand, the industry has investigated sugarless coatings containing compounds such as xylitol, sorbitol, mannitol, hydrogenated isomaltulose and hydrogenated starch hydrolyzates. These sugarless compounds contain sweetening characteristics but are devoid of commonly known sugars such as sucrose, dextrose, fructose, glucose and equivalent products.

Hard coatings containing sorbitol are common in the art. Sorbitol is generally acceptable because of its availability and the low cost. Sugarless gums coated with sorbitol, however, suffer from deficiencies. For example, sorbitol coating solutions are difficult to employ in the coating process. In addition, sorbitol coated products are usually rough, contain colored spots or blotches, and are waxy. Furthermore, because of its hygroscopicity, sorbitol dries and crystallizes slowly. Thus, sorbitol coated products are often rejected by consumers because of their rough and mottled appearance and lack of crunchiness as compared to sugar coatings.

Accordingly, a need currently exists in the confectionery market place for a gum with a hard coating which possesses the appealable characteristics of a sugar coating. To satisfy consumers, the coating would ideally be identical in appearance, taste, and mouth feel to a sugar coating. To satisfy the manufacturers, the coating would be high in stability, easy to apply and economical.

The non-sugar polyols such as sorbitol, mannitol, xylitol and hydrogenated isomaltulose have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like coating ingredient for a coated chewing gum product that would not contribute to dental caries nor cause gastrointestinal disturbances.

One such coating ingredient comprises guar gum hydrolyzate. This coating ingredient or bulk sweetener is not approved for use in human food products or in chewing gum in the U.S. However, a GRAS affirmation petition for guar gum hydrolyzate as a human food ingredient is currently being prepared. The bulk sweetener is approved for use in Japan and is being used in a variety of foods. Although a carbohydrate, guar gum hydrolyzate does not contribute to dental caries, does not cause as significant gastrointestinal disturbances as polyols and does not significantly contribute to calories. Thus, this ingredient's use in chewing gum could be a definite improvement.

Guar gum, which is found in the seeds of two leguminous plants, has found extensive uses as a food additive. U.S. Pat. No. 3,843,818 discloses low calorie pastas made with guar gum. In U.S. Pat. No. 3,996,389, guar gum has been disclosed as a stabilizer for ice cream, ice milk and sherbet. Culinary mixes containing guar gum are disclosed in U.S. Pat. No. 3,161,524. A process for producing low odor, low taste guar gums useful in foods is described in U.S. Pat. No. 3,455,899. Use of guar gum in liquid chewing gum and chewing gum with the texture of rice cake is disclosed in Japanese Patents Publications Nos. 85-224449 and 87-146562. Other patents which disclose the use of guar gum are PCT Publication No. WO 90/14017 and EPO Patent Publication No. 0 324 720. An enzyme treated guar gum is disclosed in U.S. Pat. No. 4,332,894.

Guar gum is a high molecular weight polysaccharide which, when dissolved in water, forms very high viscosity solutions or gels at low concentrations. Due to the molecular weight and resulting high viscosity aqueous solutions, guar gum has found only limited utility as a bulking agent for food.

In order to make guar gum more suitable for foods, it needs to be hydrolyzed to obtain a guar gum hydrolyzate. Guar gum hydrolyzate and its use in foods is disclosed in EPO Patent Publications No. 0 449 594 and 0 457 098, and PCT Patent Publication No. WO 93/15116. The use of guar gum hydrolyzate in chewing gum is disclosed in Japanese Patent Publication No. 1993-115247.

An enzymatically hydrolyzed guar gum was described at a seminar given by IBC USA Conferences Inc. (International Business Communications) in Atlanta, Ga. on Mar. 13–14, 1991. Information on guar gum hydrolyzate is disclosed in a manual from the seminar and is available from IBC USA Conferences, Inc., 8 Pleasant Street, Bldg. D, South Natick, Mass.

The enzymatically hydrolyzed guar gum is produced by Taiyo Kagaku Co., Ltd. and is being marketed in the U.S. by Sandoz Nutrition Corp. of Minneapolis, Minn. under the trade name Sunfiber or Benefiber.

Guar gum is in a family of materials called galactomannans. These materials are made up of mannose and galactose units. The main chain consists of $(1\rightarrow 4)$—linked $\beta$-D-mannose residues and the side chains of $(1\rightarrow 6)$—linked $\alpha$-D galactose. Locust bean gum is another galactomannan.

Galactomannans themselves are part of a larger group of natural gums. One specific natural gum that is not a galactomannan is karaya gum. PCT Publication No. WO 93/15116 discloses a process for hydrolyzing guar gum, locust bean gum and karaya gum, which are characterized as "natural carbohydrate" gums. The hydrolyzates disclosed in the PCT Publication may be useful in a manner similar to Sunfiber, which is a guar gum hydrolyzate.

In addition to the concerns about the bulking agent in the coating, pan coating of pellet gum, whether it be sugar or sugarless, requires the use of coating additives as modifiers that act to improve the quality of the pan coating. For sugar gum, these coating additives are typically maltodextrins, starches, modified starches and gum arabic. These materials bind the coating to the core, as well as act like a film former to protect the core from absorbing moisture from the coating. They also help protect the core and coating from outside humidity conditions. These coating additives are especially needed for a polyol coating such as xylitol. U.S. Pat. No. 4,127,677 discloses a gum coating of xylitol with gum arabic as a binder. U.S. Pat. No. 4,828,845 discloses xylitol coating using a film forming agent, binder and plasticizer.

The prior art has indicated that gum arabic is needed when coating with xylitol. Gum arabic has unique features as a film former and as a binder. Materials like maltodextrins or modified starch have similar properties, but because they are glucose polymers, are not suitable for sugarfree gum products. On the other hand, gum arabic, which is considered sugarfree, has constantly varied in price, quality and availability in the past years.

SUMMARY OF THE INVENTION

Chewing gum products covered with a coating containing a natural carbohydrate gum hydrolyzate and methods of making such gum products have been invented. The hydrolyzate is used in the coating, such as a hard-shell coating, for a pellet gum. Even though the hydrolyzate is similar to sucrose, it is not cariogenic, nor does it cause gastrointestinal disturbances, giving a highly consumer-acceptable chewing gum product.

It has also been discovered that small quantities of guar gum hydrolyzate has similar properties to gum arabic in a coating solution. Guar gum hydrolyzate can be used to replace gum arabic in sugarless coatings. Hydrolyzates of locust bean gum and karaya gum can also be used. Like gum arabic, guar gum hydrolyzate and the hydrolyzates of locust bean gum and karaya gum may be considered sugarfree and appear to be an excellent replacements for gum arabic.

DETAILED DESCRIPTION OF THE PREFERRED EMBODIMENTS

All percents herein are weight percents unless otherwise specified. As used herein, the term "chewing gum" also includes bubble gum and the like.

As noted above, guar gum is obtained from the guar plant, cultivated in India and Pakistan. Guar gum is widely used as a food stabilizer, and is also proved to have excellent fiber properties. However, it is too viscous as a dietary fiber in food applications.

By hydrolyzing guar gum to form the hydrolyzate, either by acid or enzyme treatment, the viscosity is significantly reduced. Sunfiber, enzymatically hydrolyzed guar gum, has a viscosity at least 2,000 times less than that of normal guar gum. Therefore, it has found wide use in food applications in Japan as a new fiber source. Both the enzymatic hydrolyzate, Sunfiber, and the acid hydrolyzate of guar gum are referred to as guar gum hydrolyzate and may be used in chewing gum coatings.

The molecular weight of Sunfiber is about ten times lower than that of guar gum. To produce Sunfiber, guar gum is hydrolyzed by the enzyme β,D—mannanase from *Aspergillus niger*, is refined by activated carbon, sterilized and spray dried. Sunfiber is a white powder, soluble in cold water, and the solution is colorless, transparent and almost sweetless. The viscosity of a Sunfiber solution is much lower than the viscosity of a guar gum solution. A viscosity of 10% Sunfiber solution is about 10 cps, as compared to 3,000 cps for a 1% guar gum solution.

The natural carbohydrate gum hydrolyzate may be used in a chewing gum coating solution in its solid or syrup form. The solubility of guar gum hydrolyzate in water is about 60% at room temperature, but increases with increased temperature. Other natural carbohydrate gum hydrolyzates, such as locust bean gum hydrolyzate and karaya gum hydrolyzate, may also be used in chewing gum coatings, in their solid or syrup forms.

The present invention uses natural carbohydrate gum hydrolyzates, preferably guar gum hydrolyzates in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique, sugar-coated pellet gum. Conventional panning procedures generally apply a liquid coating to a pellet. The liquid coating is then solidified, usually by drying the coating. The hard-shell coating layer is built up by successive coating and drying steps.

Guar gum hydrolyzate bulk sweetener is very stable and can be easily added to a sugar solution prepared for sugar panning. Guar gum hydrolyzate may be added in a liquid form to the sucrose coating, or any other sugar or alditol coating, or may be used alone in solution as the coating on pellet gum. Guar gum hydrolyzate can also be added as a powder blended with other powders often used in some types of conventional panning procedures. The other natural carbohydrate gum hydrolyzates can be used in the same manner.

Conventional panning procedures generally coat with sucrose, but recent advances in panning have allowed the use of other carbohydrate materials to be used in the place of sucrose, yet still obtain a hard-shell coating. Some of these components include, but are not limited to, dextrose, maltose, xylitol, lactitol, maltitol, erythritol, hydrogenated isomoltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum and gum tragacanth, insoluble carbonates like calcium carbonate or magnesium carbonate, and talc. Guar gum hydrolyzate also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the coating and with the guar gum hydrolyzate sweetener to yield unique product characteristics.

Another method to improve coating processes using sugars or alditols is to add a powder coating after a liquid coating. The powder coating may include natural carbohydrate gum hydrolyzates, maltodextrin, gelatin, cellulose derivatives, starches, modified starches, sugars, sugar alcohols, natural carbohydrate gums and fillers like talc and calcium carbonate. This will reduce stickiness and allow a faster build-up of coating.

Natural carbohydrate gum hydrolyzate may constitute about 0.1% to about 100% of the coating. If the natural carbohydrate gum hydrolyzate is to be 100% of the coating, the coating is made by applying the natural carbohydrate gum hydrolyzate coating solution followed by a natural carbohydrate gum hydrolyzate powder to dry the coating solution.

Natural carbohydrate gum hydrolyzates may be added to the liquid syrup and used as a panning modifier with other sugar and sugar alcohol syrups such as dextrose, sucrose, xylitol, lactitol, maltitol and hydrogenated isomaltulose. A natural carbohydrate gum hydrolyzate may act as a binder to, and film former for, the sugar or sugar alcohol coating.

Although natural carbohydrate gum hydrolyzates may be combined with sucrose or dextrose in solution or as a powder to prepare a coating, it is preferable to use the hydrolyzates in polyol coatings. Natural carbohydrate gum hydrolyzates may be used in a coating of about 0.1% to about 20%, and preferably about 1% to about 10% of the sugar or polyol coating. The coating of the pellet will be about 0.5% to about 50% of the product weight, and preferably about 20%–50%.

The preferred embodiment of this invention is the use of guar gum hydrolyzate in polyol coatings. With xylitol coatings, which are soft and non-tacky, guar gum hydrolyzate adds binding power to strengthen the coating the way that gum arabic does. With maltitol, lactitol or hydrogenated isomaltulose coatings, which are tacky and harder, it acts as a film former and modifier to give a smoother coating, also the way that gum arabic does. The usage level in polyol coatings is the same as the sugar coatings. Other coating additives may also be added to the coating. These are cellulose derivatives and other vegetable gums as film formers, insoluble fillers like calcium and magnesium carbonate, colorants like titanium dioxide and food dyes, flavors and antitack agents such as emulsifiers to give a quality coating. The most preferred embodiment is a coating with xylitol having about 60–80% solids, titanium dioxide, and about 5% solids of guar gum hydrolyzate.

For sugar coated gum, gum arabic and some high-solubility dextrins make the coating very tacky, but offer very good protection from moisture sorption. On the other hand, these materials also make the coatings rougher and, because of their color, make the coating darker.

Also during storage at high humidity, the coating becomes dark quickly. The use of modified starches in the sugar coating has proved to be beneficial. The coating is whiter initially, and remains whiter longer when stored at high humidity, even though there is actually a higher moisture gain for sugar/modified starch coating than for a sugar/gum arabic coating. From a product quality standpoint, a quality appearance is preferred compared to product moisture protection.

As noted previously, modified starches cannot be used in a xylitol coated product when the product is to be sugarfree. As a result, natural carbohydrate gum hydrolyzates like Sunfiber may be used as either a total or partial replacement of gum arabic. This gives a quality coating with xylitol similar to a sugar/starch coating in terms of appearance acceptability, coating smoothness, and adequate moisture protection.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. As used herein, the term "bulking and sweetening agent" comprises not only those ingredients that perform both bulking and sweetening functions, but also combinations of ingredients that together perform the functions, such as combinations of low sweetness bulking agents and high-intensity sweeteners.

Sugarless sweeteners include sorbitol, mannitol, xylitol, hydrogenated starch hydrolyzates, maltitol and the like, alone or in combination. In sugar gum, typical bulking agents include sucrose, dextrose, maltose, dextrin, dried inert sugar, fructose, levulose, galactose, corn syrup solids and the like, alone or in combination. High-intensity sweeteners include aspartame, alitame, dihydrocalcones, sucralose, cyclamate, saccharin, acesulfame K, glycyrrhizin, thaumatin, monellin, stevioside and the like, alone or in combination. The bulking and sweetening agents typically comprise about 5% to about 90% of the gum composition, preferably from about 20% to about 80%, and most preferably about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzate, corn syrup and combinations thereof may be used as softeners and binding agents in gum.

A flavoring agent may be present in the chewing gum in an amount within the range of from about 0.1 to about 10.0 weight percent, and preferably from about 0.5 to about 3.0 weight percent of the gum. The flavoring agents may comprise essential oils, synthetic flavors or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

The coating applied to the gum pellet may contain components such as flavoring agents, artificial sweeteners and dispersing agents, coloring agents, film formers and binding agents. Flavoring agents contemplated by the present invention include those commonly known in the art and already discussed herein. The flavoring agents may be added to the coating syrup in an amount such that the coating will contain about 0.2% to about 1.2%, and preferably about 0.7% to about 1.0%, flavoring agent.

Artificial sweeteners contemplated by the present invention include those substances already mentioned herein including but not limited to synthetic substances, saccharin, thaumatin, sucralose, alitame, saccharin salts, aspartame and acesulfame-K. The artificial sweetener may be added to the coating syrup in an amount such that the coating will contain about 0.01% to about 0.5%, and preferably about 0.02% to about 0.3%, artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain between about 0.1% to about 1.0%, and preferably about 0.3% to about 0.6%, of the agent.

Coloring agents are preferably added directly to the syrup in the dye or lake form. Coloring agents contemplated by the present invention include food quality dyes. Film formers preferably added to the syrup, include methyl cellulose, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup and used throughout the coating procedure. Binding agents contemplated by the present invention include alginates, gum arabic, maltodextrins, gelatins and the like. Where the coating is a sugar or alditol coating, a natural carbohydrate gum hydrolyzate may be the binding agent.

In general, the coating process is carried out in a rotating pan. Gum center pellets to be coated are placed into the rotating pan to form a moving mass. The material or syrup which will eventually form the coating is applied or distributed over the gum center pellets. Flavoring agents may be added before, during and after applying the syrup to the gum centers. Once the coating has dried, additional syrup additions may be made to produce a plurality of coatings or multiple layers of coating.

In the coating panning procedure, syrup is added to the gum center pellets at a temperature in the range of about 100° F. to about 220° F. Preferably, the syrup temperature is between about 150° F. and to about 200° F. throughout the process. The syrup may be mixed with, sprayed upon, poured over, or added to the gum center pellets in any way known to those skilled in the art.

The gum center pellets may be coated with a single hard layer or a plurality of hard layers. In general, a plurality of layers is obtained by applying single coats, allowing the layers to dry, and then repeating the process. Any number of coats may be applied to the gum center pellets. Preferably, no more than about 75 coats are applied to the gum center pellets. More preferably, less than about 60 coats are applied and most preferably, between about 30 to about 60 coats are applied. In any event, the present invention contemplates applying an amount of syrup sufficient to yield a hard coated chewing gum product containing about 10 to about 75% coating. Preferably, the final product will contain between about 20% and about 50% coating.

Those skilled in the art will recognize that in order to obtain a plurality of hard coated layers, a plurality of premeasured aliquots of coating syrup may be applied to the gum center pellets. It is contemplated, however, that the volume of aliquots of syrup applied to the gum center pellets may vary throughout the coating procedure.

In addition, it is contemplated by the present invention that a flavoring agent may be added to the syrup, or applied to the gum center pellets while the syrup coating is drying or after the coating has dried. Furthermore, the flavoring agent may be applied after any sequence of coats, for example, the third, twelfth, eighteenth, etc. coat.

Once a coating of syrup is applied to the gum center pellets, the present invention contemplates drying the wet syrup in an inert medium. A preferred drying medium comprises air. Preferably, forced drying air contacts the wet syrup coating in a temperature range of about 80° to about 115° F. More preferably, the drying air is in the temperature range of about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate of about 2800 cubic feet per minute. Furthermore, if a flavoring agent is applied after a syrup coating has been dried, the present invention contemplates drying the flavoring agent with or without the addition of a drying medium.

The following example is not to be construed as a limitation upon the present invention, but is included merely as an illustration of an embodiment of the present invention.

EXAMPLE 1

The following gum center formulation was made:

| | |
|---|---|
| Gum Base | 33.0 |
| Sorbitol | 44.06 |
| Calcium Carbonate | 13.0 |
| Glycerin | 8.0 |
| Peppermint Flavor | 1.80 |
| Encapsulated Aspartame | 0.14 |
| | 100.0 |

A 1,000 gram quantity of the above center formula was placed in a lab size coating pan, and coated with a solution of:

| | |
|---|---|
| Xylitol | 2100 grams |
| Sunfiber | 99 grams |
| Titanium Dioxide | 15 grams |
| Water | 1116 grams |

This solution was brought to boiling, held at 60°–90° C. and applied as a coating to the gum centers in about 40 applications with drying in between each application as commonly done in the art. A 4 gram quantity of peppermint flavor was added at the 10th coat. Coating continued until a 33% weight gain was achieved.

Comparative Example

A 1,000 gram quantity of the above gum centers of Example 1 was coated as in Example 1 except that spray dried gum arabic was used in place of Sunfiber.

Results showed that Example 1 gave a smoother, whiter coating than the comparative example and gave an improved quality coating. Moisture sorption tests showed that Sunfiber did not protect gum from humidity as well as gum arabic, but did keep the product whiter when stored at high humidity similar to a sugar/modified starch coating.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A coated chewing gum product comprising a gum pellet coated with a coating comprising a natural carbohydrate gum hydrolyzate.

2. The coated chewing gum product of claim 1 wherein the natural carbohydrate gum hydrolyzate is selected from the group consisting of guar gum hydrolyzate, locust bean gum hydrolyzate, karaya gum hydrolyzate and mixtures thereof.

3. The coated chewing gum product of claim 1 wherein the hydrolyzate material comprises about 0.1% to about 20% of the coating.

4. The coated chewing gum product of claim 1 wherein the coating further comprises a material selected from the group consisting of sucrose, dextrose, maltose, xylitol, maltitol, erythritol, lactitol, hydrogenated isomultulose and mixtures thereof.

5. The product of claim 1 wherein the coating comprises a hard shell coating.

6. The coated chewing gum product of claim 1 wherein the coating is non-cariogenic.

7. The coated chewing gum product of claim 1 wherein the coating comprises xylitol and guar gum hydrolyzate.

8. A method of making a coated chewing gum product comprising the steps of:

a) providing a gum pellet;

b) applying a liquid coating syrup to the surface of the gum pellet, the coating syrup comprising a natural carbohydrate gum hydrolyzate; and c) solidifying the coating syrup to form a coating.

9. The method of claim 8 wherein the natural carbohydrate gum hydrolyzate is selected from the group consisting of guar gum hydrolyzate, locust bean gum hydrolyzate, karaya gum hydrolyzate and mixtures thereof.

10. The method of claim 8 wherein the coating syrup comprises a solution and the step of solidifying the coating comprises drying the solution.

11. The method of claim 8 wherein the coating syrup is applied in successive layers, with each layer of syrup being dried before application of an additional layer.

12. The method of claim 11 wherein a powdered coating is applied after one or more of the syrup layers is applied.

13. The method of claim 12 wherein the powdered coating comprises natural carbohydrate gum hydrolyzates, sugars, sugar alcohols, maltodextrins, gelatins, cellulose derivatives, starches, modified starches, natural carbohydrate gums, fillers or mixtures thereof.

14. The method of claim 8 wherein the coating syrup is solidified to form a hard shell coating.

15. The method of claim 12 wherein the coating comprises hydrolyzate material at a level of greater than 20% of the coating.

16. The method of claim 8 wherein the coating comprises about 0.1% to about 20% natural carbohydrate gum hydrolyzate.

17. The method of claim 12 wherein the powdered coating comprises 100% natural carbohydrate gum hydrolyzate.

18. The method of claim 8 wherein the coating comprises xylitol and guar gum hydrolyzate.

19. The method of claim 8 wherein the coating is non-cariogenic.

* * * * *